(12) United States Patent
Pagliasotti

(10) Patent No.: US 7,911,075 B2
(45) Date of Patent: Mar. 22, 2011

(54) BUILDING-INTEGRATED SYSTEM FOR CAPTURING AND HARVESTING THE ENERGY FROM ENVIRONMENTAL WIND

(76) Inventor: Robert R. Pagliasotti, Denver, CO (US)

( * ) Notice: Subject to any disclaimer, the term of this patent is extended or adjusted under 35 U.S.C. 154(b) by 0 days.

(21) Appl. No.: 11/974,675

(22) Filed: Oct. 15, 2007

(65) Prior Publication Data
US 2010/0257795 A1    Oct. 14, 2010

(51) Int. Cl.
*F03D 9/00* (2006.01)
(52) U.S. Cl. .......................................... 290/55; 52/173.1
(58) Field of Classification Search .................. 52/173.1, 52/1, 234, 236.3, 302.1, 750; 415/2.1, 4.1, 415/4.2, 4.3, 4.4, 4.5, 191, 146, 147, 211.2, 415/224, 905, 907, 908, 909; 60/398; 290/43, 290/44, 45, 54
See application file for complete search history.

(56) References Cited

U.S. PATENT DOCUMENTS

| 400,209 | A | * | 3/1889 | Haskins | 415/126 |
| 544,654 | A | * | 8/1895 | Bowen | 290/55 |
| 3,537,378 | A | * | 11/1970 | Daly | 454/337 |
| 4,098,034 | A | * | 7/1978 | Howell | 52/1 |
| 4,134,710 | A | * | 1/1979 | Atherton | 416/117 |
| 4,651,805 | A | * | 3/1987 | Bergeron, Jr. | 165/45 |
| 5,394,016 | A | * | 2/1995 | Hickey | 290/55 |
| 6,097,104 | A | * | 8/2000 | Russell | 290/54 |
| 6,201,313 | B1 | * | 3/2001 | Nakamats | 290/54 |
| 6,225,705 | B1 | * | 5/2001 | Nakamats | 290/43 |
| 6,319,115 | B1 | * | 11/2001 | Shingaki | 454/186 |
| 6,765,309 | B2 | * | 7/2004 | Tallal et al. | 290/55 |
| 6,996,937 | B2 | * | 2/2006 | Halloran | 52/1 |
| 7,340,898 | B2 | * | 3/2008 | Miller | 60/641.8 |
| 7,368,828 | B1 | * | 5/2008 | Calhoon | 290/55 |
| 2003/0111843 | A1 | * | 6/2003 | Tallal et al. | 290/55 |
| 2007/0018462 | A1 | * | 1/2007 | Richards et al. | 290/55 |
| 2008/0315592 | A1 | * | 12/2008 | Branco | 290/55 |
| 2010/0037541 | A1 | * | 2/2010 | Kane | 52/173.1 |
| 2010/0084867 | A1 | * | 4/2010 | Sato | 290/52 |
| 2010/0126086 | A1 | * | 5/2010 | Paggi | 52/173.1 |
| 2010/0181779 | A1 | * | 7/2010 | Elliott et al. | 290/55 |

FOREIGN PATENT DOCUMENTS

JP    57008368 A  *  1/1982
JP    04306339 A  *  10/1992

* cited by examiner

*Primary Examiner* — Robert J Canfield
*Assistant Examiner* — Babajide Demuren
(74) *Attorney, Agent, or Firm* — Fennemore Craig, P.C.

(57) ABSTRACT

A system is disclosed for capturing and harnessing energy from environmental wind which impinges the outer wall surfaces of a building. The system includes at least one elongated conduit disposed within an enclosure of a building, the conduit having first and second end portions opening to the building outer wall surfaces. A wind deflector mechanism is disposed at each of the first and second conduit end portions. Each such wind deflector mechanism is adapted to direct environmental wind, which impinges against the building outer wall surface proximate the end portion, into the conduit to provide bi-directional air flow passing through the conduit. At least one wind collector device is disposed within the conduit, and the wind collector has air impact elements mounted to a shaft. Each wind collector device is adapted to interact with the bi-directional air flow moving within the conduit originating from either first or second conduit end portions to rotate the wind collector shaft. Finally, a wind turbine device is disposed within the building and is operatively interconnected to the wind collector shaft to generate electricity from the rotation thereof.

3 Claims, 5 Drawing Sheets

BUILDING-INTEGRATED SYSTEM FOR CAPTURING AND HARVESTING THE ENERGY FROM ENVIRONMENTAL WIND

BACKGROUND OF THE INVENTION

1. Field of the Invention

The present invention relates generally to devices for converting wind energy to electrical energy and, more particularly, to systems utilizing wind driven turbine generators. Specifically, the present invention relates to systems integrated into buildings which are adapted to capture environmental wind impacting the building and harness its energy for use in generating the power requirements for that building.

2. Description of the Prior Art

In the last several decades, considerable attention has been given to non-petroleum forms of energy generation and in particular to renewable forms of energy. Such renewable energy sources include biomass conversion systems, passive and active solar energy devices, and wind energy driven systems. Wind driven turbines and windmills have been used for centuries to capture energy and generate power. There have been constant efforts to increase the efficiency of and hence the energy production from wind turbines. However, to date it has been very difficult to generate significant energy from wind sources due to inefficiencies of wind turbine devices as well as the lack of prevalent winds on a consistent basis in many geographical locations.

Wind power is one of the most promising and cost-effective renewable energy technologies available today. One advantage of wind power is that even though it is intermittent, it blows both day and night. All 50 U.S. states have sufficient wind to justify wind power turbines. One problem with the present standard wind turbine is that it needs to be located away from populous areas. This is due to the fact that homeowners to not want large blades spinning in their backyards over their heads. Such devices are expensive, large, loud, kill birds and somehow seem dangerous.

Windmill systems utilize wind driven generators having blades that are turned and powered by the passing of airflow from the wind. The first successful attempt in the United States at producing electric power to feed a utility network using large-scale windmills was in Vermont which system utilized a two-bladed windmill mounted on a 150-foot tower. The 175-foot blades were pitch controlled and drove an AC alternator at constant speed. Other examples of such systems utilizing many large-scale windmills can be found in Wyoming and California. Additionally, there have been attempts to erect windmill towers or other central-type power generation systems such as illustrated in U.S. Pat. Nos. 969,587 and 4,321,476.

Other examples include attempts to incorporate such wind energy systems positioned adjacent large building structures for purposes of creating the necessary power from wind to heat and/or cool such structures, such as illustrated in U.S. Pat. Nos. 6,041,596 and 6,097,104. Such systems require that the building structure itself be designed around the wind generation system, thus affecting and limiting the size and shape of such buildings. Moreover, solar power generators are often coupled with these wind systems since they are not designed to maximize use and capture of wind energy.

Finally, individual residential residences and commercial structures have been modified to incorporate wind and solar energy power systems such as illustrated in U.S. Pat. Nos. 5,394,016 and 6,765,309 in order to generate power for a specific residential or commercial building. Again, a common problem with such systems is the lack of consistent prevalent winds to power the windmill or auger blades. Moreover, significant noise problems can be created by windmill towers in residential neighborhoods as well as unsightly mechanical devices or collectors projecting from the exterior of these structures.

While some of these devices have proven to be effective in converting wind energy to electrical energy, there remains a need for systems which incorporate such wind turbine devices for use in areas where constant prevalent winds may not necessarily be present as well as systems which are adapted for use by individual buildings, including multi-story commercial buildings, for their own power needs. Therefore, there remains a need in the art for such a system or arrangement, and the present invention addresses and solves this particular problem in the art.

SUMMARY OF THE INVENTION

Accordingly, it is one object of the present invention to provide a system for capturing and harnessing wind energy efficiently from environmental wind.

It is another object of the present invention to provide such a system that can effectively capture and convert such wind energy as it impacts any of the various exterior surfaces of a building regardless of the direction from which the wind may originate.

Yet another object of the present invention is to provide a system for providing the power needs of a commercial building from wind energy impinging the exterior surfaces of the building wherein such system is integrated into the building structure itself without creating exterior objects projecting form the building.

Still another object of the present invention is to provide a system for heating and cooling a commercial multi-story building by incorporating wind energy conversion systems into the duct work inbetween floors of the building so as to be autonomous from the surrounding city power grid without having to add exterior structures to the building design itself.

Another object of the invention is to provide a wind energy conversion system for heating and cooling a commercial multi-story building by incorporating the energy conversion systems into the areas inbetween floors of the building utilizing space which is presently substantially wasted or inefficient in use.

To achieve the foregoing and other objects and in accordance with the purpose of the present invention, as embodied and broadly described herein, a system is disclosed for capturing and harnessing energy from environmental wind which impinges the outer wall surfaces of a building. The system includes at least one elongated conduit disposed within an enclosure of a building, the conduit having first and second end portions opening to the building outer wall surfaces. A wind deflector mechanism is disposed at each of the first and second conduit end portions. Each such wind deflector mechanism is adapted to direct environmental wind, which impinges against the building outer wall surface proximate the end portion, into the conduit to provide bi-directional air flow passing through the conduit. At least one wind collector device is disposed within the conduit, and the wind collector has air impact elements mounted to a shaft. Each wind collector device is adapted to interact with the bi-directional air flow moving within the conduit originating from either first or second conduit end portions to rotate the wind collector shaft. Finally, a wind turbine device is disposed within the building and is operatively interconnected to the wind collector shaft to generate electricity from the rotation thereof.

In one modification of the invention, each wind deflector mechanism includes air inlet elements which are adapted to capture environmental wind originating from one or more directions exterior to the outer surface of said building at the conduit end portion, and to deflect the captured wind into the conduit to create an axial airflow therein, the air inlet elements of the opposite conduit end portion being adapted to exhaust the axial airflow after passing through the conduit.

In modification of this invention, the system further includes venturi elements disposed within the conduit which are adapted for accelerating air flow into the conduit. In one form of this, the venturi elements are pivotally mounted within the conduit between an inward orientation adapted to accelerate wind directed into the conduit by the deflector mechanism, and an outward orientation adapted to permit wind to freely exit the conduit.

In yet another modification, each wind turbine device includes a generator which is adapted to provide electric energy for purposes of powering the heating and cooling systems of the building, the generator being disposed proximate to the conduit.

In one form of this modification, the system includes a plurality of the conduits disposed within a building, with the wind collectors and wind turbine devices thereof being adapted to all provide electric energy to power the heating and cooling systems of the building. In one aspect of this, a plurality of the conduits are aligned substantially parallel with each other and disposed between adjacent floors of the building.

In still another modification of the invention, the system includes a plurality of such conduits, wherein the building enclosing these conduits includes a plurality of outer wall surfaces with the conduits being aligned such that each building wall surface includes at least one conduit end portion with its wind deflector mechanism exposed to the environmental wind impinging the building outer wall surface proximate thereto.

In another modification of the invention, a building-integrated system is disclosed for providing power needs of a building generated from wind energy impacting the exterior surfaces of the building. The system includes at least one elongated substantially hollow airflow conduit having first and second end portions and which extends through the building between opposite outer wall surfaces of thereof. A wind deflector mechanism is disposed at each conduit end portion. Each wind deflector mechanism has omni-directional air inlet elements adapted to capture environmental wind originating from plural compass directions and impacting the building exterior surface proximate the end portion, the air inlet elements deflecting captured wind into the conduit to create a substantially axial airflow therein. Airflow turbulence control elements are disposed within the conduit to create substantially laminar airflow along the length thereof. A plurality of wind collector devices are disposed within the conduit with each having air impact elements mounted to a shaft. Each wind collector is adapted to interact with the axial airflow moving within the conduit originating from either the first or second conduit end portions to rotate the wind collector shafts. Finally, a wind turbine device is disposed within the building and is operatively connected to the wind collector shafts to generate electricity from the rotation thereof.

Yet another modification includes a system for providing energy to heat and cool a multi-story building by capturing the energy from wind impinging the exterior surfaces of the building. The system includes a plurality of elongated airflow conduits extending through the building between opposite exterior wall surfaces thereof. The conduits are disposed between adjacent floors of the multi-story building with each conduit having first and second end portions open to the building exterior wall surfaces. A wind deflector mechanism, in the form of a plurality of air inlet elements, is disposed at each conduit end portion and is adapted to capture environmental wind impacting the building exterior surface proximate the end portion. The air inlet elements deflect captured wind into the conduit to create a substantially axial airflow therein. Airflow turbulence control elements are disposed within the conduit to create substantially laminar airflow along the length thereof. At least one wind collector device is disposed within each conduit with each wind collector device having air impact members mounted to a shaft for interacting with the axial airflow moving within the conduit originating from either first or second conduit end portions to rotate the wind collector shafts. At least one wind turbine device is disposed proximate the conduit and is operatively interconnected with the wind collector shafts for generating electricity therefrom for use in heating and cooling the airspace in rooms located in adjacent floors of the multi-story building. Finally, an airflow direction sensing element is disposed within each conduit for determining the direction of the axial airflow within the conduit based on the direction of environmental wind impacting the building exterior surfaces, the sensing element opening the air inlet elements at the first and second end portions accordingly.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings.

DETAILED DESCRIPTION OF THE EXEMPLARY EMBODIMENTS

Referring first to FIGS. 1-6, a multi-story commercial building 10 is illustrated with a plurality of ducts or conduits 12 enclosed therein. It should be understood that the present invention may be used with any type of residential or commercial building, single or multi-story, for the purposes of providing energy for heating or cooling thereof by capturing and converting the energy from environmental wind impinging upon the exterior surfaces 14 of such structure. When there is a prevailing wind direction relative to the building's design or orientation, then the components of the invention may be oriented and designed relative to the building exterior wall surfaces in a manner different from situations where the wind is frequently multi-directional, although the present invention may be efficiently applied and utilized in any such situations.

Figure 5:
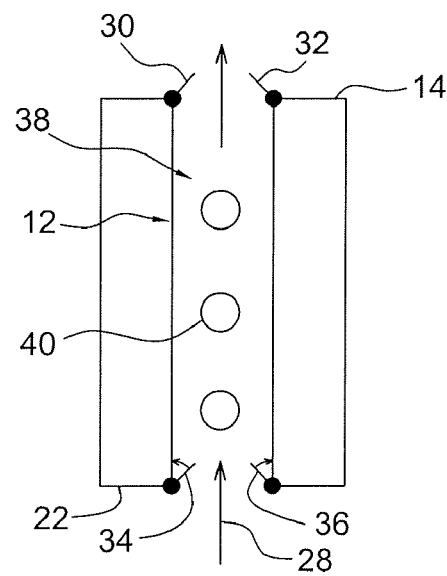
FIG. 5 is a detailed schematic similar to that of FIG. 4 but illustrating the wind originating from an opposite direction relative to the exterior surfaces of a building.

More specifically, the invention includes at least one such conduit 12 disposed within a building structure. Each conduit 12 preferably includes two end portions 16, 18 which open to opposite building wall surfaces 20, 22, respectively. The conduits 12 preferably include wind deflector mechanisms 24 at each end portion 16, 18 thereof or the purpose of directing environmental wind impinging against the building outer wall surfaces 20, 22 proximate said end portions 16, 18 into said conduit 12 to provide axial air flow passing through said conduit in either direction depending on the prevailing winds impinging the building 10. In one illustrated embodiment, the wind direction 26 causes the axial low to move from end portions 16 to 18, while the wind direction 28 causes the axial air flow in the conduit 12 to move in the opposite direction from end portion 18 to 16 as illustrated in FIG. 5.

Figure 3:
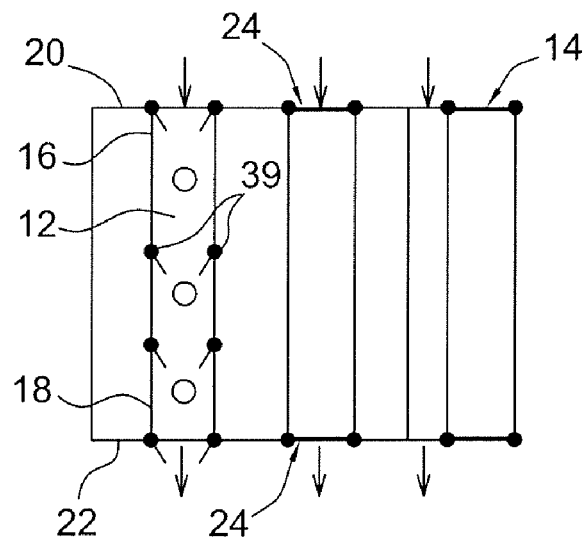
FIG. 3 is a schematic illustration of another embodiment of the invention but illustrating a plurality of conduits disposed along one building level.
Figure 4:
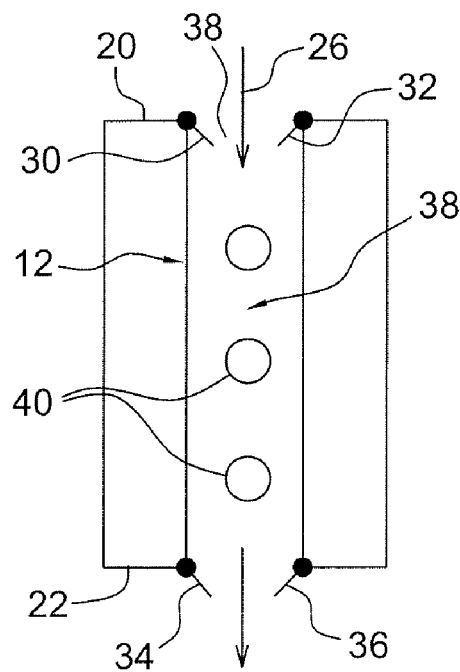
FIG. 4 is a detailed alternate schematic of an embodiment of the invention with the wind impacting one wall surface of a building structure.

The wind deflector 24 may be constructed in any desired form to accomplish the desired purpose. In one preferred embodiment, the mechanism 24 is in the form of a pair of pivotally mounted louver fins 30, 32 at the first end portion 16 and a pair of pivotally louver fins 34, 36 at the second end portion 18. When the wind direction is as shown by the arrow 26, the louvers 30, 32 open inwardly into the conduit 12 so as to form a venturi channel 38 to assist in directing wind into the conduit 12 as well as accelerate and control turbulence of the axial airflow therein. The louvers 34, 36 are forced outwardly away from the conduit 12 so as to permit the air flow to more readily exit the conduit 12 at the exterior surface 22. When the prevailing winds are in the direction illustrated by the arrow 28, then the louvers 32, 34 open outwardly and the louvers 34, 36 open inwardly. Thus, the laminar airflow created within the conduit 12 may be bi-directional depending on the winds impinging the building exterior surfaces. In addition, as illustrated in FIG. 3, a plurality of pivotal airflow turbulence control elements 39 may be spaced along the interior of the conduit 12 to assist in creating the laminar flow therein.

Figure 6:
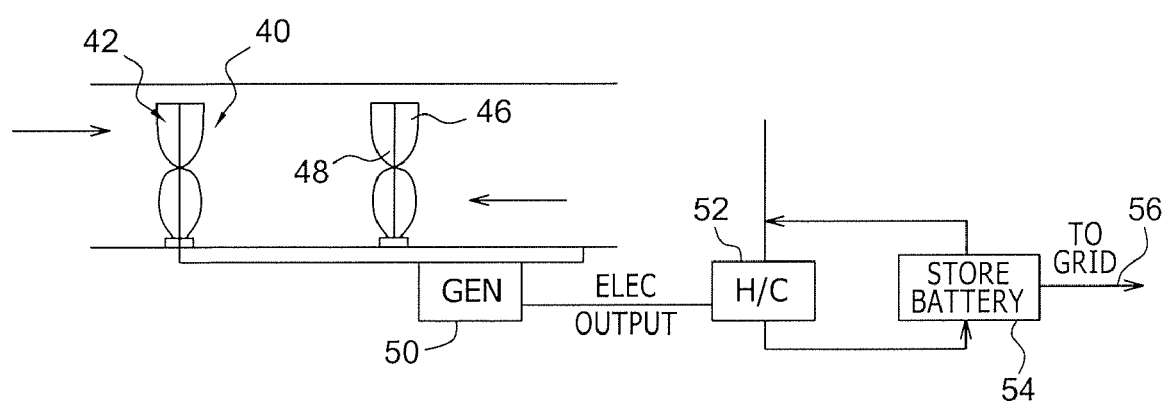
FIG. 6 is an enlarged schematic illustration of an embodiment as constructed in accordance with the present invention and illustrating wind collectors which may be utilized in the invention.

At least one and preferably a plurality of wind collectors 40 are disposed in the conduits 12 so as to project into the path of the laminar airflow created therein. While the wind collectors 40 may be of any desired design, they each preferably include a plurality of wind impact elements or propellers 42. In one preferred embodiment as illustrated in FIG. 6, the wind collectors 40 are in the form of helically shaped blades 46 mounted to a shaft 48 and aligned substantially vertically within the conduit 12 relative to the airflow therein. In this manner, the wind collectors 40 may be rotated along their shafts 48 regardless of the direction of the airflow within the conduit 12. The shafts of the collectors 40 are then operatively interconnected to a wind turbine device 47 (e.g., generator devices 50), as known in the art, so as to create wind generators.

The generators 50 create electrical energy that is then used directly in the heating and cooling systems 52 of the building housing the conduit. Should the building needs be such that the generators are creating more energy then is needed at any one particular time, then the excess energy may be preferably stored in one or more storage batteries 54 for use at later times when needed. In addition, should the energy storage or the batteries or cells 54 be at capacity, then the added excess energy may be directed back into the electric grid 56 for payment by the utility industry. It should be understood that the generators 50 may be disposed proximate the conduits 12 or they may be positioned remotely in the basement of the building 10 as illustrated in FIG. 1.

Figure 1:
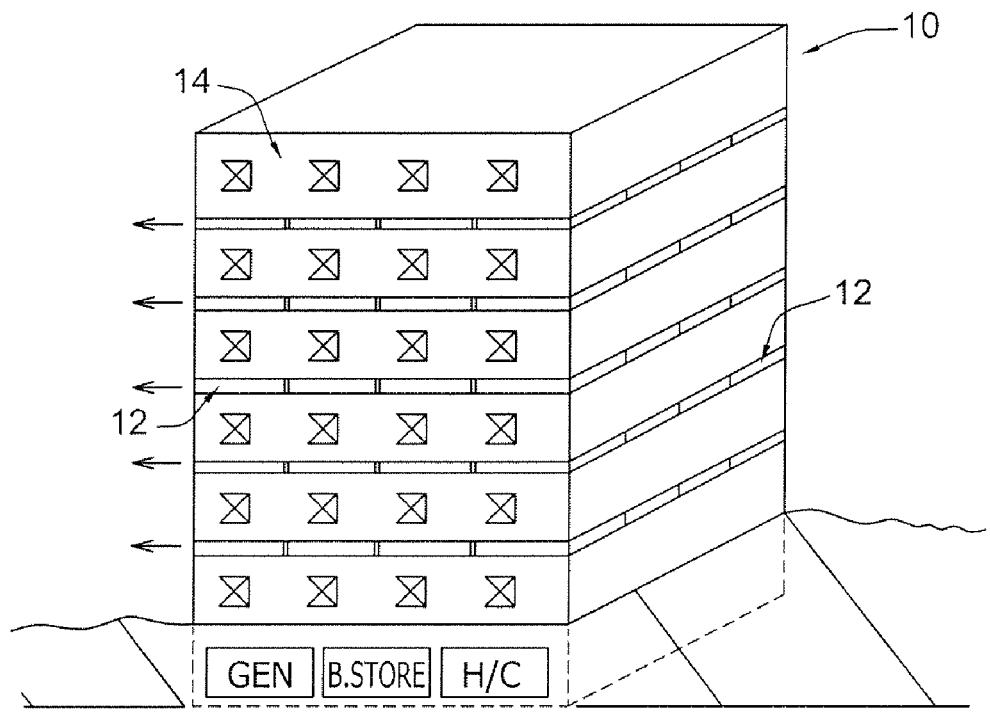
FIG. 1 is a front perspective view of a multi-story commercial building incorporating the present invention therein.
Figure 2:
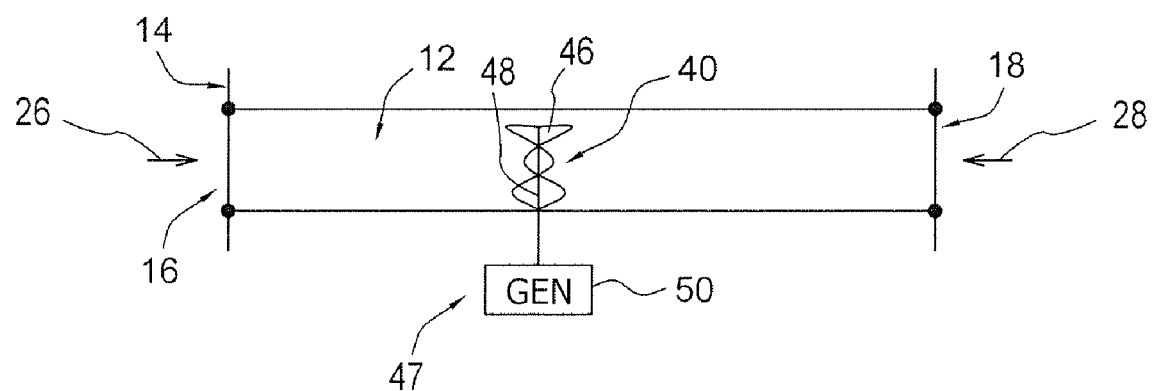
FIG. 2 is a side schematic illustration of one conduit embodiment constructed in accordance with the present invention.

In one preferred form of the invention as illustrated in FIG. 1, the conduits 12 are preferably aligned substantially parallel and adjacent to each other in the ductwork between floors of the building 10. In this manner a substantial number of wind collectors and associated generators may be operatively interconnected to generate substantial amounts of electrical energy without any noticeable units or hardware projecting outwardly of the building's exterior as is the case of many prior art designs. This design also permits efficient use of the duct space that typically exists between floors in multi-story building structures. In the instance where the prevailing environmental wind is substantially uniform from one direction, then the arrangement illustrated in FIG. 1 is most efficient. However, in those instances where the wind may originate from any number of differing directions, as is often the case in windy cities such as Chicago and Seattle, the design of FIG. 7 is optimal.

Figure 7:
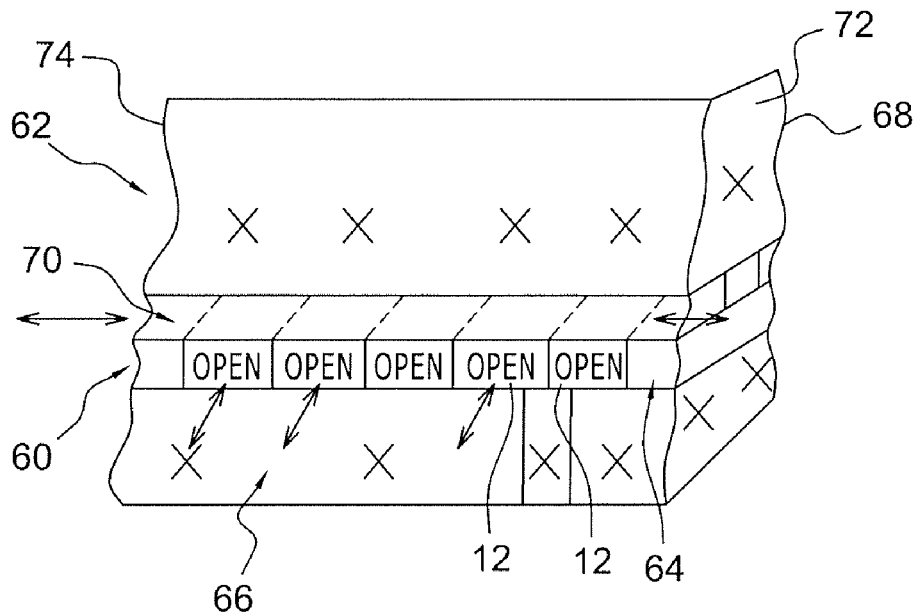
FIG. 7 is a schematic illustration of yet another embodiment as constructed in accordance with the present invention.

Referring now to FIGS. 1 and 7, an assembly 60 of conduits 12 may be interposed between adjacent floors of a multi-story building 62. In this arrangement, the assembly 60 includes a first set 64 of substantially parallel conduits 12 mounted next to each other and aligned to open onto opposite building wall surfaces 66, 68, while a second set 70 of similar substantially parallel conduits 12 are disposed immediately above the first set 64 of conduits 12. The second set of conduits are oriented to and aligned to open onto opposite building wall surfaces 72, 74. In this manner, regardless of the direction of the environmental winds, the conduit assembly 60 may capture and convert the energy thereof for use in operating the energy needs of the building 62. Moreover, this arrangement may also include a plurality of such assemblies with one being disposed between each set of adjacent floors of the building 62.

Figure 8:
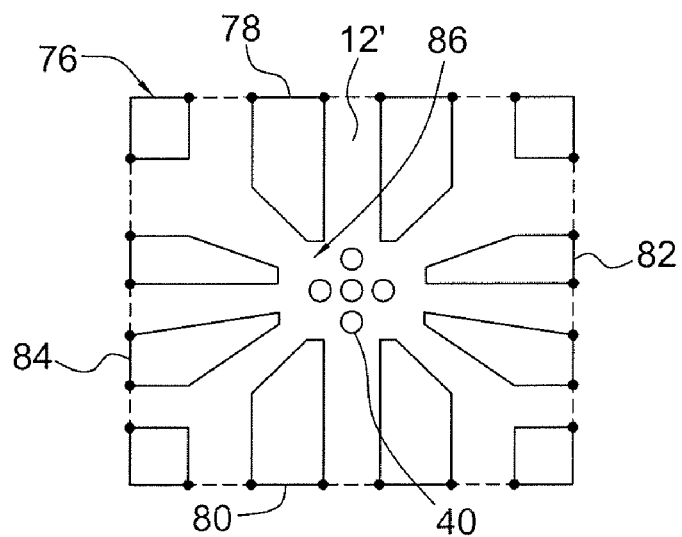
FIG. 8 is a top sectional schematic of yet another embodiment of the present invention incorporated into the building design of a commercial building structure.

Referring now to FIG. 8, another embodiment of the present invention is illustrated. In this embodiment, a building 76 includes a plurality of conduits 12' opening to each of the exterior wall surfaces 78, 80, 82 and 84. In this arrangement, the conduits 12' are disposed between floors of the building 76 and operate similar to the above described conduits 12'. However, in this embodiment the conduits 12' all open into a central area 86 wherein the wind collectors 40 are disposed. In this manner, any wind impinging the walls 78-84 is directed into the conduits 12' in the form of airflow into the central area 86 to operate the wind collectors 40 and their associated wind generator systems 50, previously described. The airflow may exit from the central area 86 along any route which is not receiving input airflow, since there will be a reduced air pressure along the end portions of the conduits 12' which are not receiving impacted environmental wind.

Figure 9:
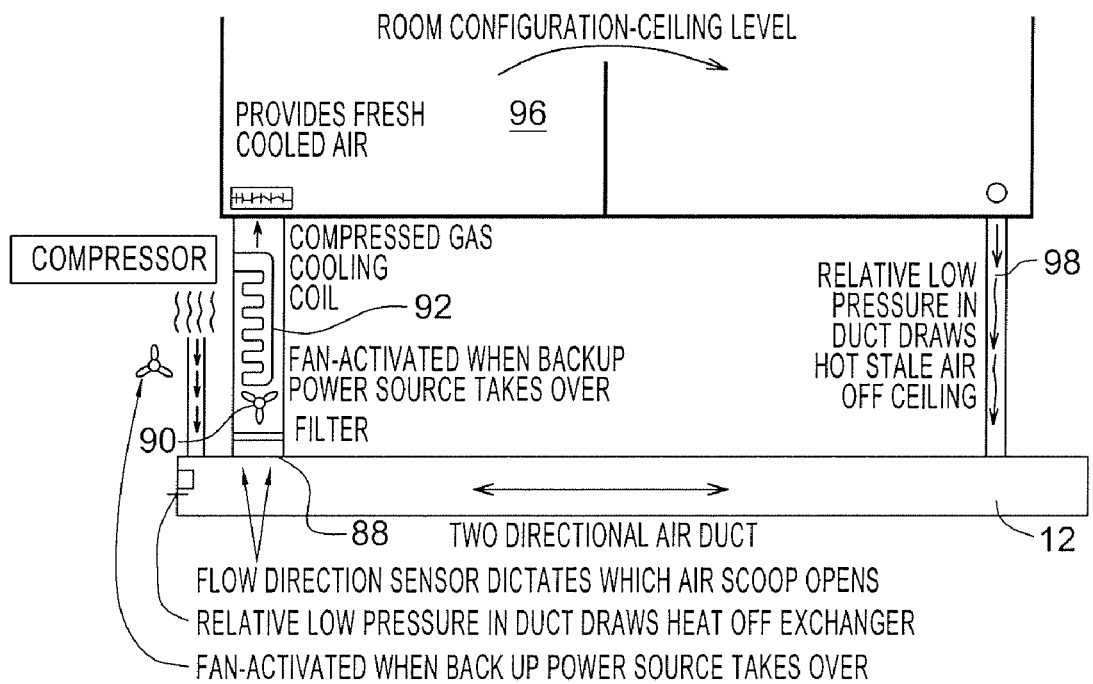
FIG. 9 is a schematic of another embodiment constructed in accordance with the present invention.
Figure 10:
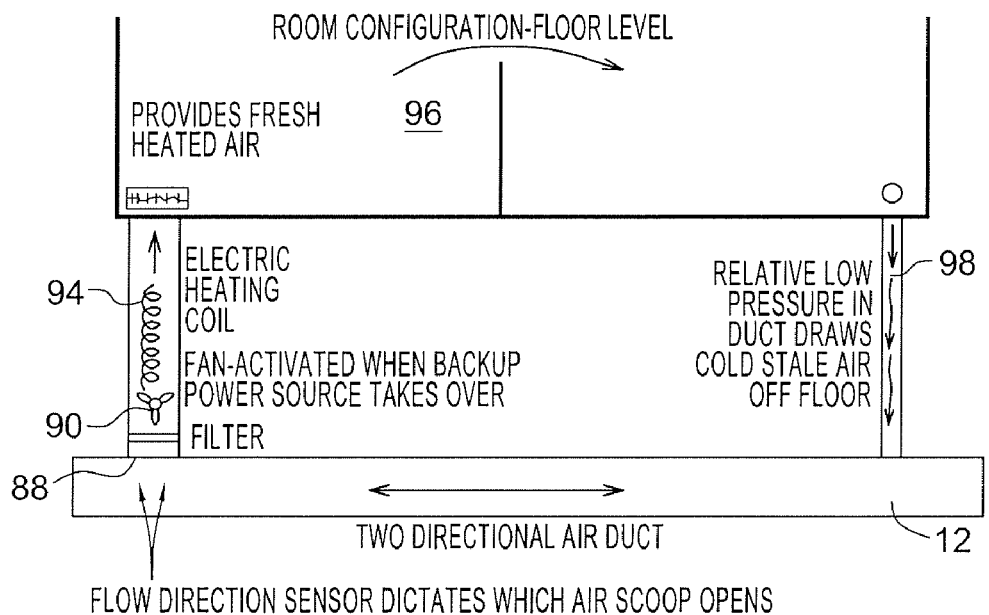
FIG. 10 is a schematic of still another embodiment similar to that of FIG. 9 as constructed in accordance with the present invention.

Referring now to FIGS. 9 and 10, yet another embodiment of the invention is illustrated. In this embodiment, the conduits 12 operate as in the previous embodiments. In these embodiments, however, flow detection sensors 88 are provided to determine the direction of the laminar airflow within the conduit 12 and whether there is even any airflow at all. When there is an absence of airflow in the conduits 12 due to a lack of environment wind, an impeller device 90 is operated from an outside power source or from stored battery energy to draw air through the conduit 12 and past an air cooling mechanism 92 or an air heating mechanism 94 to provide, respectively, cooled or heated air to the rooms 96 of the floor adjacent to the conduit 12. A return duct 98 interconnects the rooms 96 with the conduit 12 such that axial airflow within the conduit 12 created by natural wind impact or the impeller mechanism 90 creates a low pressure center to circulate air out from the rooms 96 and through the conduits 12 to exit the building.

The concept of the present invention is particularly useful for installation in average single-family homes or in use with commercial multi-story buildings. In any of the described embodiments, the present invention takes up virtually no ground space and can be integrated into new building designs without utilizing significant work space. These devices of the invention can also be constructed to blend in more with the environment and building structures. In preferred form, the invention is omni-directional in that it has a 360-degree view of environmental wind impacting the exterior building surfaces and therefore can handle wind from any one direction or from multiple directions. The interior airflow feature of the invention allows it to handle high winds without any negative effect and can in fact work effectively and efficiently in high wind areas. It can also handle substantial wind gusts and has an airflow anti-turbulence feature which further increases the performance of the invention.

As can be seen from the above, the present invention provides a system for capturing and harnessing environmental wind energy in an effective and efficient manner. The present invention eliminates prior art unsightly and noisy windmill systems or building augmentation arrangements previously used. Moreover, the present invention provides a system that is adaptable for use with individual residential structures or multi-story commercial building structures and may be integrated into a new structure or added onto an existing structure without significant loss of work space. The device of the invention is designed to operate even at times of high, gusty winds unlike some prior wind power devices which automatically shut down during such situations. Additionally, the present invention is designed to be easily maintained. Finally, the present invention provides an efficient, inexpensive and practical alternative for generating energy from a renewable energy resource while providing substantially all of the energy needs of a building immediately or from storage.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

What is claimed is:

1. A system for capturing and harnessing energy from environmental wind which impinges the outer wall surfaces of a building, said system comprising:
   at least one elongated conduit disposed within an enclosure of a building, said conduit having first and second end portions opening to the building outer wall surfaces;
   a wind deflector mechanism disposed at each said first and second conduit end portion, each said wind deflector mechanism being adapted to direct environmental wind impinging against the building outer wall surface proximate said end portion into said conduit to provide bi-directional air flow passing through said conduit;
   at least one wind collector device disposed within said conduit and having air impact elements mounted to a shaft, each said wind collector device being adapted to interact with the bi-directional air flow moving within said conduit originating from either said first or second conduit end portions to rotate said wind collector shaft;
   a wind turbine device disposed within said building and operatively interconnected to said wind collector shaft to generate electricity from the rotation thereof; and
   at least one venturi element pivotally mounted within said conduit between an inward orientation adapted to accelerate wind directed into said conduit by said deflector mechanism, and an outward orientation adapted to permit wind to freely exit said conduit.

2. A building-integrated system for providing power needs of a building generated from wind energy impacting the exterior surfaces of the building, said system comprising:
   at least one elongated substantially hollow airflow conduit having first and second end portions and extending through said building between opposite outer wall surfaces thereof;
   a wind deflector mechanism disposed at each conduit end portion, each said wind deflector mechanism having omni-directional air inlet elements adapted to capture environmental wind originating from plural compass directions and impacting the building exterior surface proximate said end portion, said air inlet elements deflecting captured wind into said conduit to create a substantially axial airflow therein;
   airflow turbulence control elements disposed within said conduit to create substantially laminar airflow along the length thereof, said airflow turbulence control elements comprising a plurality of pivotally mounted louver fins disposed across each said conduit end portion to control the flow of wind into and out of said conduit end portion, said louver fins being mounted to move between a first position wherein said fins angulate inwardly into said conduit to form a venturi to accelerate airflow when wind is impacting the exterior building wall surfaces proximate said end portion, and a second position wherein said fins angulate outwardly from said conduit toward an end portion opening to assist in exiting airflow from said conduit through the end portion opposite that wherein the wind is impacting the exterior building wall surfaces;
   a plurality of wind collector devices disposed within said conduit each having air impact elements mounted to a shaft, each said wind collector being adapted to interact with the axial airflow moving within said conduit originating from either said first or second conduit end portions to rotate said wind collector shafts; and
   a wind turbine device disposed within said building and operatively connected to said wind collector shafts to generate electricity from the rotation thereof.

3. The building-integrated system as claimed in claim 2, wherein said conduit includes an airflow direction sensing element disposed in said conduit for assisting in said louver fins movement control between said first and second positions.

\* \* \* \* \*